(12) United States Patent
Meadows et al.

(10) Patent No.: US 11,219,995 B1
(45) Date of Patent: Jan. 11, 2022

(54) PIVOTING ASSEMBLY, TOOL, AND METHOD OF USE

(71) Applicant: LONE STAR COLLEGE SYSTEM DISTRICT, The Woodlands, TX (US)

(72) Inventors: Kary Meadows, Magnolia, TX (US); Humberto Andres Leal Acosta, Houston, TX (US)

(73) Assignee: LONE STAR COLLEGE SYSTEM DISTRICT, The Woodlands, TX (US)

( * ) Notice: Subject to any disclaimer, the term of this patent is extended or adjusted under 35 U.S.C. 154(b) by 0 days.

(21) Appl. No.: 17/084,458

(22) Filed: Oct. 29, 2020

(51) Int. Cl.
| | | |
|---|---|---|
| *A01B 1/22* | (2006.01) | |
| *B25G 3/38* | (2006.01) | |
| *B25F 1/02* | (2006.01) | |
| *B25G 3/12* | (2006.01) | |
| *G01N 1/08* | (2006.01) | |

(52) U.S. Cl.
CPC .................. *B25G 3/38* (2013.01); *B25F 1/02* (2013.01); *B25G 3/12* (2013.01); *G01N 1/08* (2013.01)

(58) Field of Classification Search
CPC .... B25G 3/38; B25G 3/12; B25F 1/02; G01N 1/08
USPC .............. 294/57, 58, 53.5; 16/438; 15/257.7
See application file for complete search history.

(56) References Cited

U.S. PATENT DOCUMENTS

| | | | | |
|---|---|---|---|---|
| 881,782 A | * | 3/1908 | Elliott | |
| 1,261,959 A | * | 4/1918 | Selter ................... | A43D 21/003 12/8.1 |
| 1,570,189 A | * | 1/1926 | Sturm ...................... | B25G 3/38 294/51 |
| 2,098,609 A | * | 11/1937 | Bishop ..................... | B25G 3/38 294/51 |
| 3,115,359 A | * | 12/1963 | Hendrick ................. | A01B 1/04 294/53.5 |
| 5,054,830 A | | 10/1991 | Nisenbaum | |
| 6,315,341 B1 | * | 11/2001 | Leon ....................... | A01B 1/225 294/53.5 |
| 6,457,757 B2 | * | 10/2002 | Hendrick ................. | E01H 5/02 294/53.5 |
| 6,663,085 B1 | | 12/2003 | Dalon | |
| 7,293,317 B2 | * | 11/2007 | Tsuchiya ................. | B25G 1/06 15/147.2 |

FOREIGN PATENT DOCUMENTS

| | | |
|---|---|---|
| CN | 203866870 U | 10/2014 |
| CN | 205276338 U | 6/2016 |

(Continued)

*Primary Examiner* — Paul T Chin
(74) *Attorney, Agent, or Firm* — Patterson & Sheridan, L.L.P.

(57) ABSTRACT

Embodiments of the present disclosure generally relate to a pivoting assembly, to tools including the pivoting assembly, and to their methods of use in, e.g., collecting lunar samples. One embodiment comprises a shaft coupled to a handle at one end and coupled to a pivoting assembly at the opposite end. The pivoting assembly may comprise a slotted axle, a locking rod having a head engageable with a slot of the slotted axle, and a release handle coupled to the locking rod. The release handle is movable to move the head of the locking rod into a locked position and an unlocked position. A rotatable arm is coupled to the pivoting assembly and is rotatable relative to the handle when the head of the locking rod is in the unlocked position.

20 Claims, 9 Drawing Sheets

(56) References Cited

FOREIGN PATENT DOCUMENTS

| | | |
|---|---|---|
| CN | 105881457 A | 8/2016 |
| CN | 208739769 U | 4/2019 |
| CN | 110653764 A | 1/2020 |
| JP | 2007177599 A | 7/2007 |

* cited by examiner

PIVOTING ASSEMBLY, TOOL, AND METHOD OF USE

BACKGROUND

Field

Embodiments of the present disclosure generally relate to a pivoting assembly, tools including the pivoting assembly, and their methods of use.

Conventional geological and landscaping tools, such as scoops, shovels, and rakes, have been utilized to collect lunar samples, such as rocks, pebbles, and sand, for analysis. However, in use, lunar dust and debris would seep into gaps of these tools and add unnecessary weight, as well as cause component jamming and damage. The lunar dust and debris is highly abrasive and can erode moving components and friction-bearing surfaces, which can lead to tool failure. Accordingly, the lunar dust renders these conventional geological and landscaping tools ineffective for collecting lunar samples.

There is a need for a new and improved pivoting assembly and tools having such a pivoting assembly that overcome one or more deficiencies of conventional geological and landscaping tools.

SUMMARY

Embodiments of the present disclosure generally relate to a pivoting assembly, tools including the pivoting assembly, and their methods of use.

In one embodiment, an apparatus comprises a handle; a shaft coupled to the handle at one end and coupled to a pivoting assembly at the opposite end, the pivoting assembly at least partially disposed in a housing, the pivoting assembly comprising: a slotted axle; a locking rod having a head engageable with a slot of the slotted axle; and a release handle coupled to the locking rod and disposed around the shaft, the release handle being movable along the shaft relative to the housing to move the head of the locking rod into a locked position where the head extends into the slot of the slotted axle and an unlocked position where the head is removed from the slot of the slotted axle; and a rotatable arm coupled to the pivoting assembly, wherein the rotatable arm is rotatable relative to the handle when the head of the locking rod is in the unlocked position.

In one embodiment, an apparatus comprises a tool head; a rotatable arm coupled the tool head, the rotatable arm selectively rotatable between a locked, −90° position and a locked, +90° position; and a pivoting assembly coupled to the rotatable arm and at least partially disposed in a housing, the pivoting assembly comprising: a slotted axle; a locking rod having a head engageable with a slot of the slotted axle; and a release handle coupled to the locking rod, the release handle being movable relative to the housing to lock and unlock the rotatable arm.

In one embodiment, a method of operating an apparatus comprises retracting a release handle of a pivoting assembly such that the pivoting assembly of the apparatus moves from a locked position to an unlocked position, the apparatus comprising: a rotatable arm coupled to the pivoting assembly, the pivoting assembly at least partially enclosed in a housing; a shaft coupled to the housing; and the pivoting assembly comprising: a slotted axle; a locking rod having a head engageable with a slot of the slotted axle; and a release handle coupled to the locking rod, the release handle being movable along the shaft relative to the housing to lock and unlock the rotatable arm; and rotating the rotatable arm relative to the pivoting assembly to a position.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a pivoting assembly, tools including the pivoting assembly, and their methods of use. The inventors have found a new and improved pivoting assembly that overcomes the deficiencies of conventional geological and landscaping tools when, e.g., collecting lunar samples such as rocks, pebbles, and sand. The pivoting assembly has a high level of lunar dust tolerance, increasing the life, reliability, and durability of the pivoting assembly. When the pivoting assembly is incorporated in tools for collecting lunar samples, the tools are more effective than conventional geological and landscaping tools when used for such lunar sample collection.

The pivoting assembly described herein has the ability to pivot and lock in a variety of angles. Apparatus, e.g., tools and devices, incorporating the pivoting assembly described herein are easily operable by astronauts wearing existing extravehicular activity (EVA) gloves. Further, in one embodiment, the apparatus described herein enables access to multiple tools for collecting samples, by having a hub, a socket, and/or a universal adapter. For example, a scoop head can be alternated with a rake head depending on application.

Figure 1A:
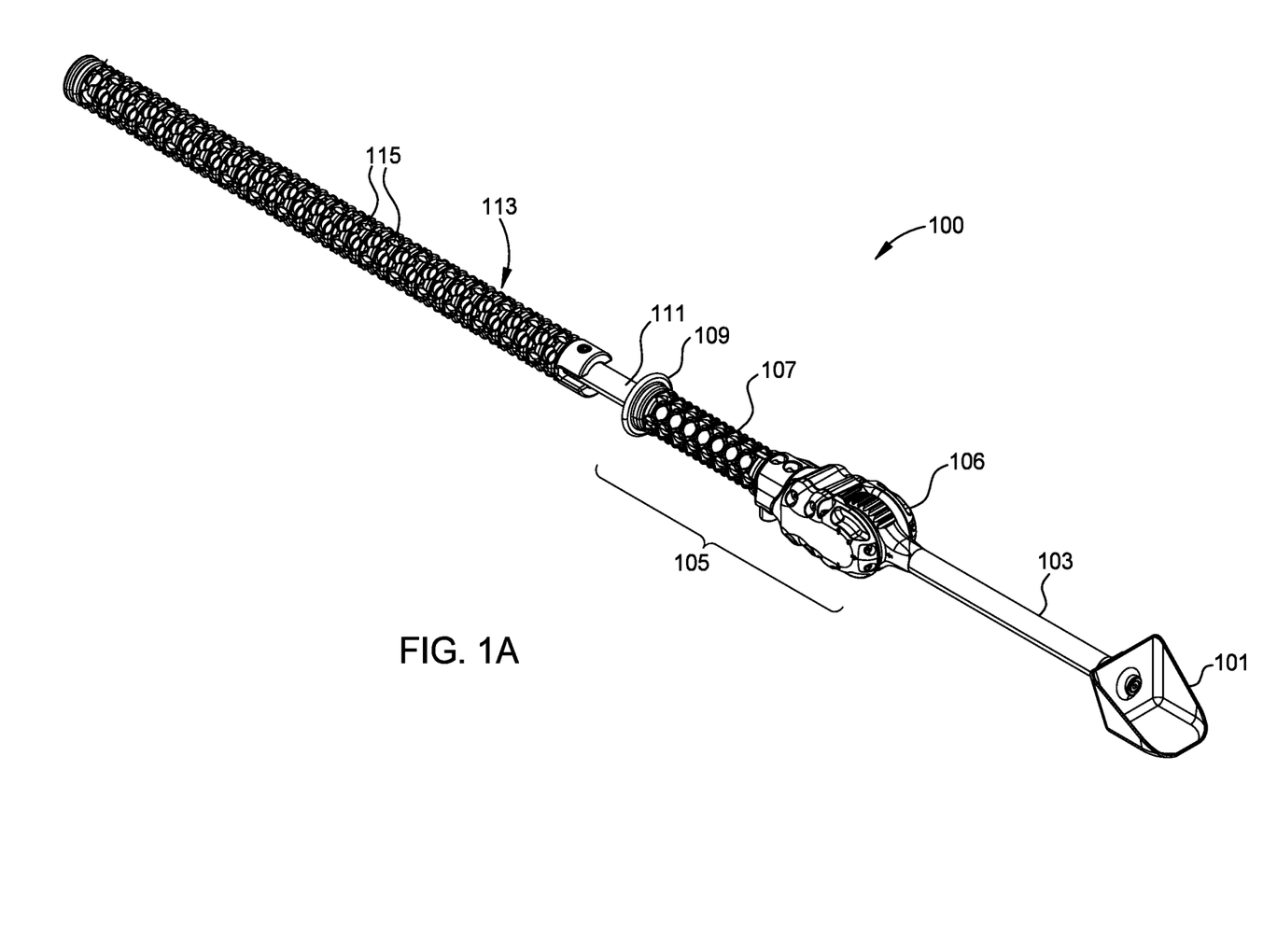
FIG. 1A is a perspective view of the front of a tool according to one embodiment of the present disclosure.
Figure 1B:
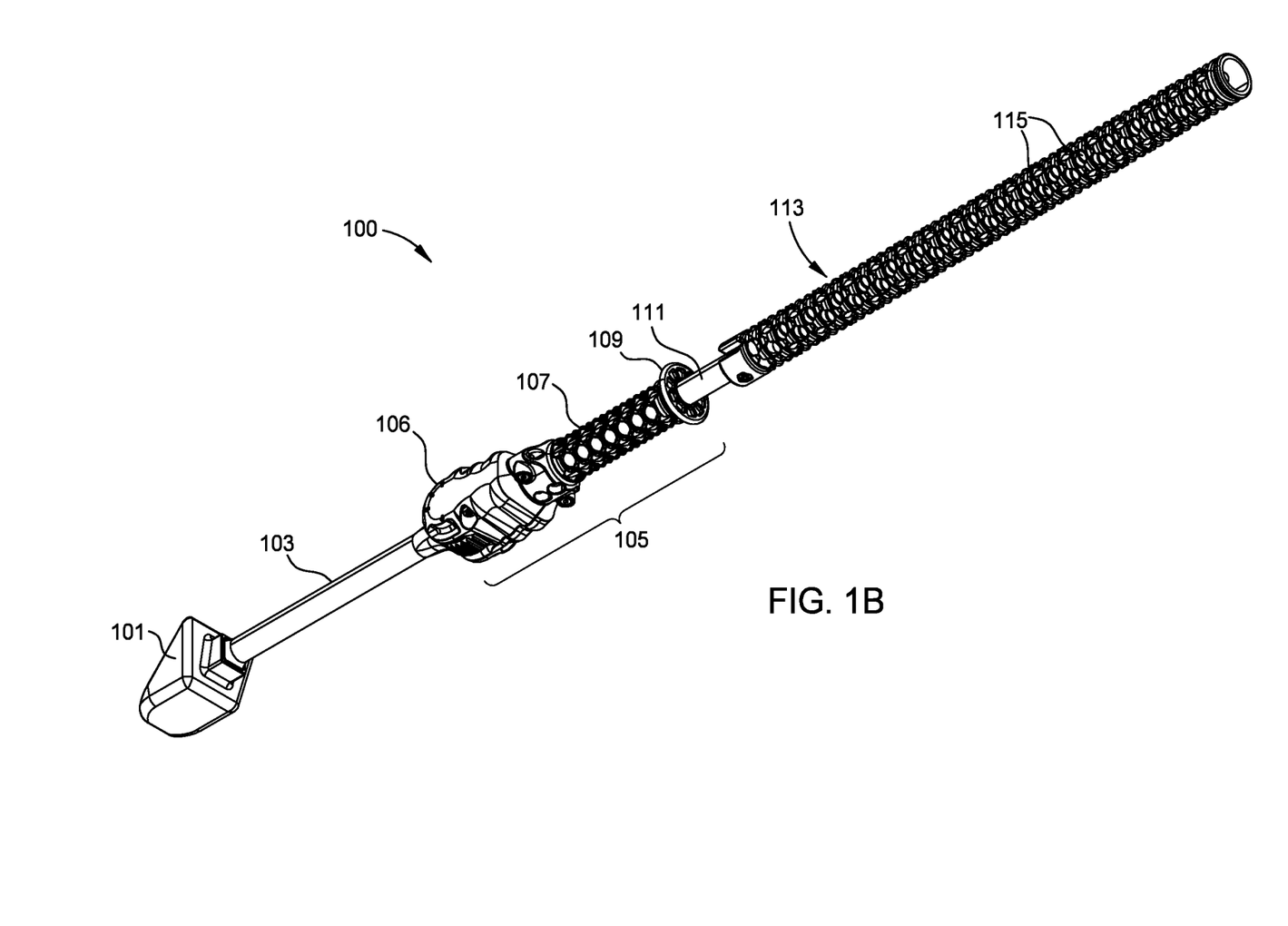
FIG. 1B is a perspective view of the back of the tool according to one embodiment of the present disclosure.

FIGS. 1A and 1B are perspective views of a tool 100 according to one embodiment of the present disclosure. Specifically, FIG. 1A and FIG. 1B show the tool 100 from the front side and the back side, respectively. The tool 100 can be utilized at various stages of lunar sample collection, such as digging, raking, and picking.

The tool 100 includes a head 101 coupled to an arm 103. The head 101 may be coupled to the arm 103 by a threaded connection, a welded connection, pins, screws, clamps, etc. The arm 103 may be a solid or hollow shaft. In one embodiment, the head 101 and the arm 103 may be integrally formed together as a single piece. As shown, the head 101 is a scoop. It is contemplated that the head 101 can be any suitable tool head such as a shovel, rake, spade, pick, hammer, tong, drill, etc., without departing from the scope of the present disclosure. In one embodiment, the head 101 may be removably coupled to the arm 103 such that one or more different styles of heads may be attached to the arm 103. A hub, a socket, and/or a universal adapter can be disposed at an end of or another location along the arm 103. Such hub, socket, and/or universal adapter can be utilized to switch between a wide variety of heads and configurations.

The arm 103 is coupled to one or more components of a pivoting assembly 105, such that the arm 103 is rotatable and can be locked in one or more angled positions. As further described below, the arm 103 is coupled to an axle of the pivoting assembly 105 allowing rotation and locking of the arm 103. The pivoting assembly 105 includes several components enclosed in a housing 106 and a release handle 107. The release handle 107 is coupled to the components in the housing 106 as further described below. The arm 103 can be secured in a locked position and in an unlocked position using one or more spring loaded detents 116 (illustrated in FIGS. 6A-6C) that are coupled to and at least partially disposed within the housing 106. The spring loaded detents 116 prevent accidental locking or unlocking of the arm 103.

The release handle 107 has an inner bore dimensioned to receive a shaft 111. One end of the shaft 111 may be coupled to the housing 106, or to components within the housing 106, by a threaded connection, a welded connection, pins, screws, clamps, etc. The opposite end of the shaft 111 may be coupled to a handle 113 by a threaded connection, a welded connection, pins, screws, clamps, etc. The release handle 107 is slidably movable relative to the housing 106, the shaft 111, and the handle 113. The release handle 107 may include an enlarged end portion 109 that can be gripped by a user to help move the release handle 107 along the shaft 111 between the locked and unlocked positions.

The handle 113 is coupled to the end of the shaft 111 opposite from the housing 106. The handle 113, as shown, is an elongated cylindrical handle. It should be understood that while a cylindrical handle is shown, a wide variety of handles may be employed without departing from the scope of the present disclosure. In one embodiment, the handle 113 can be a T-shaped handle. Portions of the handle 113, as well as portions of the release handle 107, have holes 115 to allow dust and/or debris to pass-through the handles, which reduces the use of seals and also reduces the weight of the tool 100.

Figures 2A, 2B:
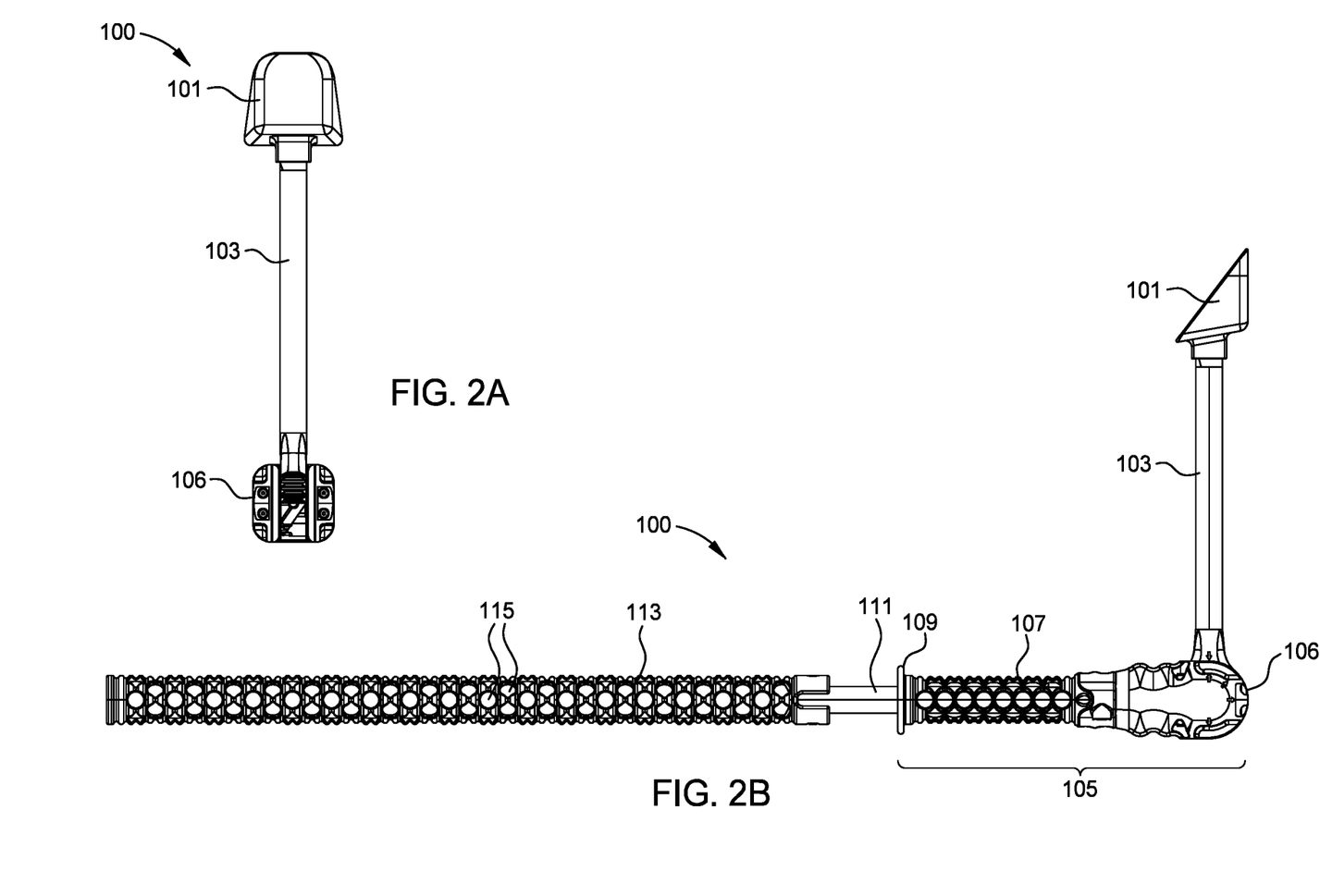
FIG. 2A is a top view of the tool shown in FIG. 1A where an arm of the tool has been rotated about 90° according to one embodiment of the present disclosure.
FIG. 2B is a side view of the tool shown in FIG. 1A where the arm of the tool has been rotated about 90° according to one embodiment of the present disclosure.

FIGS. 2A and 2B are top and side views of the tool 100 where the arm 103 is rotated 90°. The arm 103 is oriented at a perpendicular angle relative to the handle 113. Although the arm 103 is shown at a +90° angle relative to the handle 113, the arm 103 can be oriented and locked at angles between −90° and +90° relative to the handle 113.

Figure 3A:
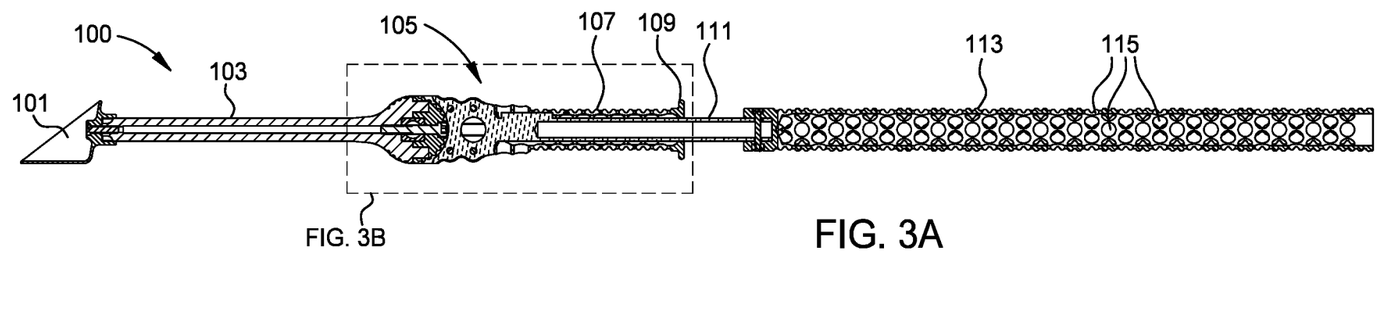
FIG. 3A is a cross-sectional view along the length of the tool according to one embodiment of the present disclosure.
Figure 3B:
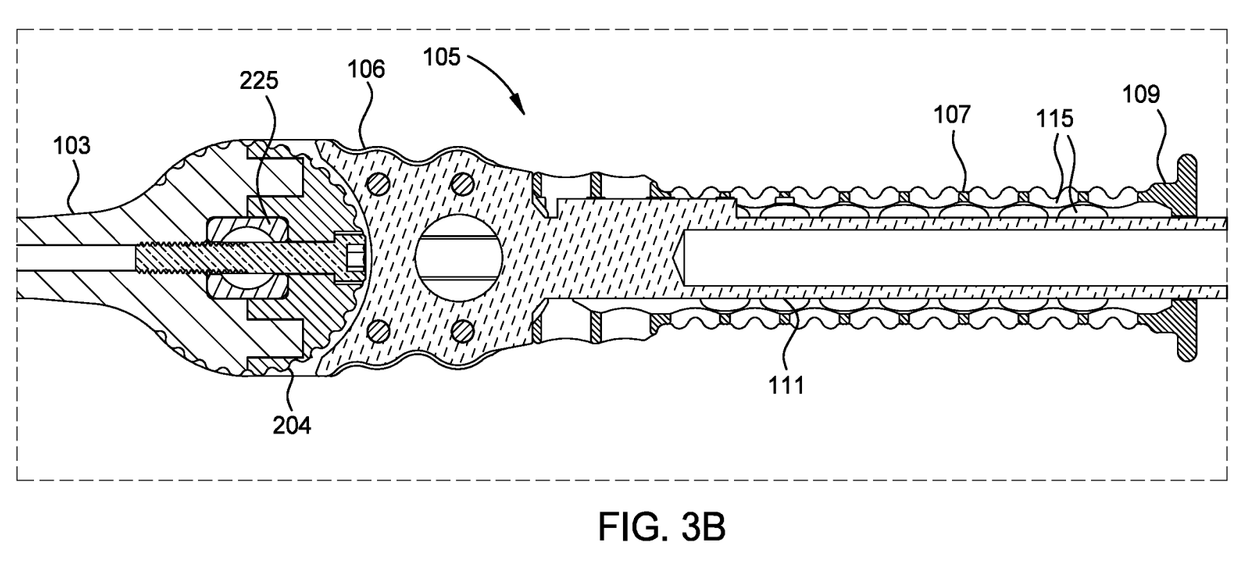
FIG. 3B is an enlarged cross-sectional view of a portion of the tool shown in FIG. 3A according to one embodiment of the present disclosure.

FIG. 3A is a cross-sectional view along the longitudinal length of the tool 100 according to one embodiment of the present disclosure. FIG. 3B is an enlarged cross-sectional view of a portion of the tool 100 shown in FIG. 3A according to one embodiment of the present disclosure. The end of the arm 103 opposite the head 101 includes a toothed portion 204 at least partially disposed in the housing 106. The toothed portion 204 of the arm 103 is coupled to a slotted axle 225 of the pivoting assembly 105 by a screw. Rotation of the arm 103 rotates the slotted axle 225. The toothed portion 204 of the arm 103 when rotated helps force out any dust and/or debris from the housing 106 to prevent the arm 103 from jamming and becoming stuck.

Figure 4A:
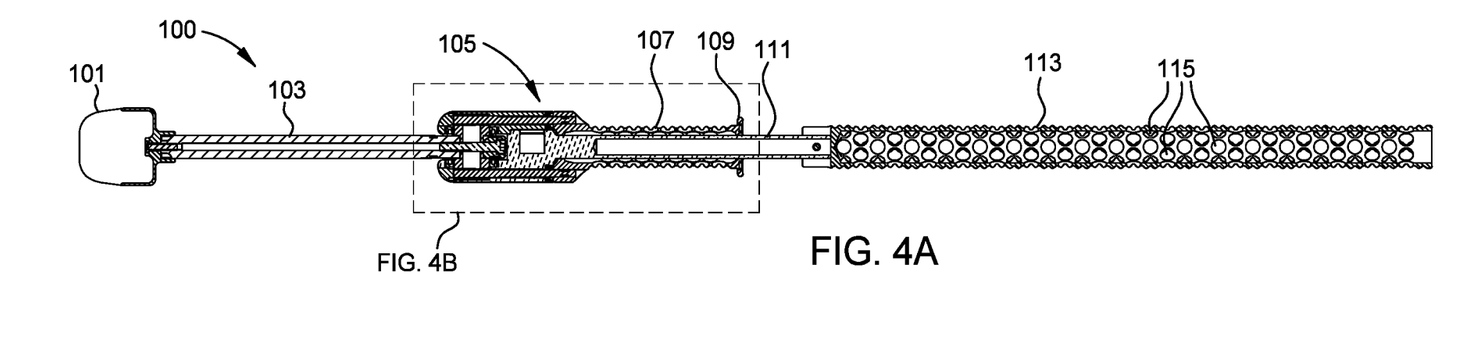
FIG. 4A is another cross-sectional view along the length of the tool according to one embodiment of the present disclosure.
Figure 4B:
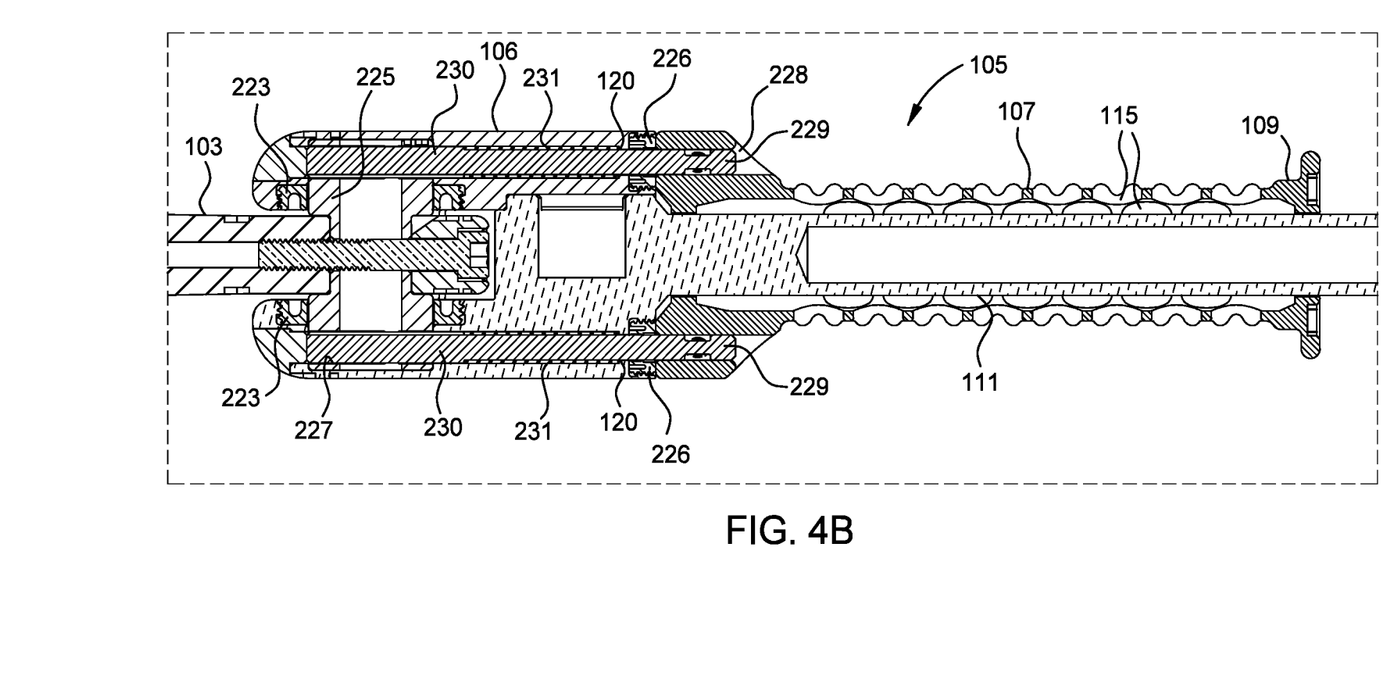
FIG. 4B is an enlarged cross-sectional view of a portion of the tool shown in FIG. 4A according to one embodiment of the present disclosure.

FIG. 4A is another cross-sectional view along the longitudinal length of the tool 100 according to one embodiment of the present disclosure. FIG. 4B is an enlarged cross-sectional view of a portion of the tool 100 shown in FIG. 4A according to one embodiment of the present disclosure. A pair of arm seals 223 are disposed around the slotted axle 225 on opposite sides of the toothed portion 204 of the arm 103. The arm seals 223 also prevent dust and/or debris from entering the housing 106. A pair of locking rods 229 are shown disposed through openings 228 in the housing 106 and into opposite ends of the slotted axle 225. A head 230 of each locking rod 229 extends through a slot 227 formed in the slotted axle 225 when the pivoting assembly 105 is in a locked position such that the arm 103 cannot freely rotate relative to the handle 113. The head 230 may have a different outer surface shape than the outer surface of the locking rod 229. The head 230 may be square or rectangular shaped, and the locking rod 229 may be cylindrically shaped. A pair of biasing members, illustrated herein as springs 231, are disposed around the locking rods 229 and between the head 230 and an inner shoulder 120 of the housing 106. The springs 231 apply a bias force to move the head 230 of each locking rod 229 into the slots 227 of the slotted axle 225 to maintain the pivoting assembly 105 and thus the tool 100 in a locked position. As further described below, the spring loaded detents 116 also engage the head 230 of the locking rods 229 to retain the tool 100 in the locked and unlocked positions. A pair of rod seals 226 are also disposed around the locking rods 229 to prevent dust and/or debris from entering the housing 106.

Figure 5:
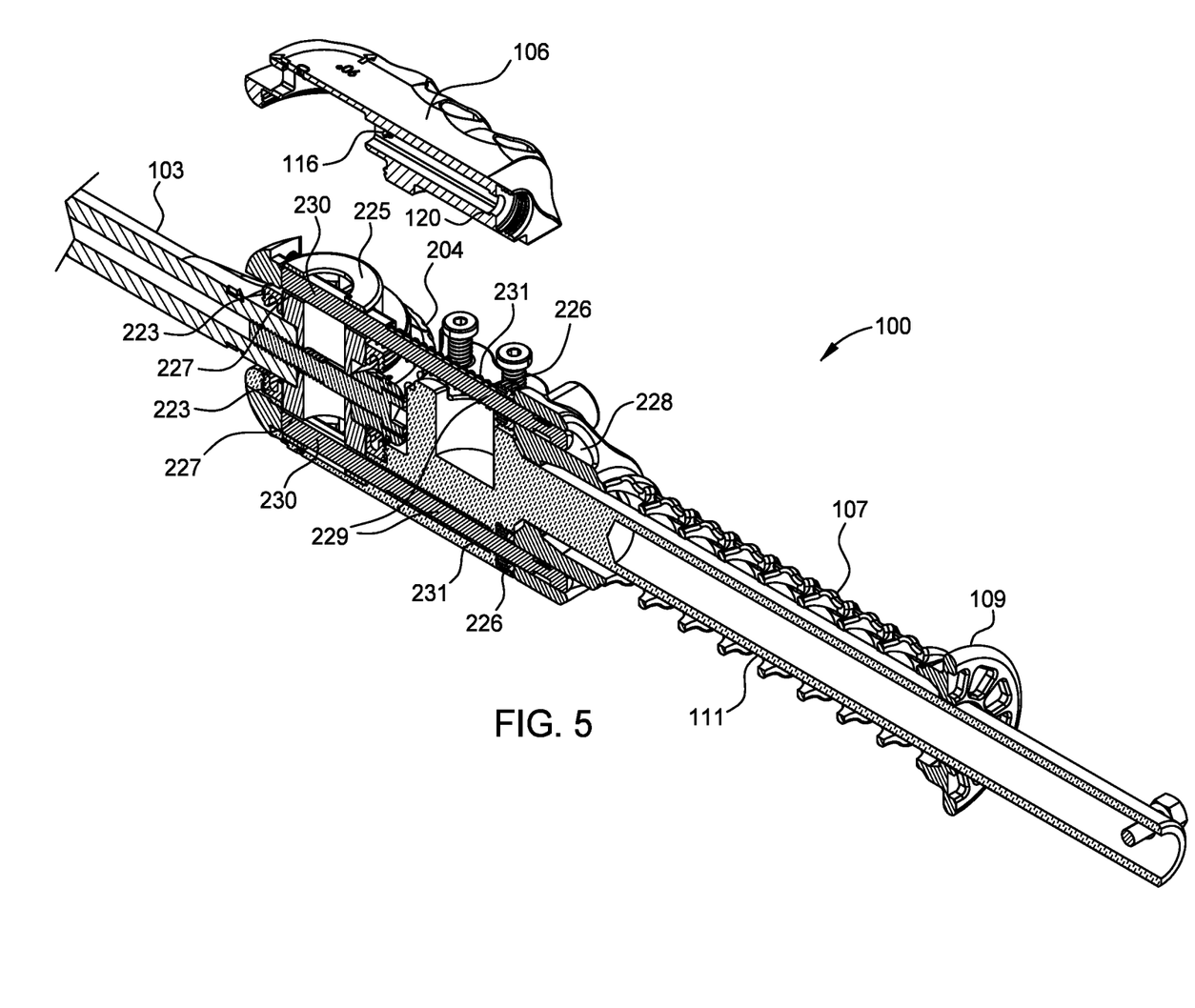
FIG. 5 is a partially exploded cross-sectional view of a pivoting assembly among other components of the tool according to one embodiment of the present disclosure.

FIG. 5 is a partially exploded cross-sectional view of the pivoting assembly 105 among other components of the tool 100 according to one embodiment of the present disclosure. A portion of the pivoting assembly 105 is disposed or encased within the housing 106. The housing 106 protects the pivoting assembly 105 against dust and other debris by, e.g., a series of seals. The arm seals 223 (e.g., double lip oil-resistant seals) individually disposed on either side of the arm 103 and the locking rod seals 226 (e.g., double lip oil-resistant seals) individually disposed around the locking rods 229 serve to shield portions of the pivoting assembly 105. The seals 223, 226 can be made of a nitrile-based rubber or other suitable rubber, such as polyether ether ketone (PEEK) or polyether ketone ketone (PEKK). The rubber may include additives such as carbon fiber to, e.g., adjust various mechanical properties of the seal. The seal geometry coupled with the selection of seal material enables a lunar-tolerant seal that is, e.g., able to mechanically withstand screwing, sufficiently durable against abrasive lunar debris, and sufficiently ductile to seal the housing 106 and components from the exterior environment.

Similarly, the toothed portion 204 of the arm 103 serves to protect the arm seals 223 by digging out any dust/debris that might become jammed into the area between the arm 103 and the arm seals 223 and/or the housing 106 when the arm 103 is rotated to a desired angle. The slotted axle 225 is restricted by a pocket formed in the housing 106 to eliminate hydraulic forcing of debris into the seals 223 from within the housing 106. The seals 223 also prevent the arm 103 from sliding side-to-side and the face of the arm 103 press-forcing debris into housing 106. The arm 103 and the toothed portion 204 can be a single piece or two separate pieces coupled together. In addition, the release handle 107 is holed such that dust or debris can fall out easily when the release handle 107 is actuated and moved. The internal profile of the release handle 107 is shaped to force debris toward the holes 115 to aid in debris removal as the release handle 107 is actuated.

The pivoting assembly 105 includes the slotted axle 225, the locking rod 229, and the spring 231 on both sides of the arm 103. Each locking rod 229 has a proximal end located near the slotted axle 225 and a distal end located away from the slotted axle 225. The proximal end is referred to as the head 230 of locking rod 229. The head 230 of locking rod 229 has a shape that enables engagement of the locking rod 229 with the slot 227 of the slotted axle 225, such that locking rod 229 can be coupled to or decoupled with the slot 227 of the slotted axle 225.

Each spring 231 is positioned around an outside diameter of the locking rod 229, and between the locking rod seal 226 and the head 230 (and specifically contacting an end of the head 230 and the inner shoulder 120 of the housing 106). The springs 231 on the locking rods 229 help the user return and retain the tool 100 to the locked position, along with the spring loaded detents 116, by moving the release handle 107 towards the housing 106 and away from the handle 113. When the locking rods 229 are inserted in the slotted axle 225 the required amount, the tips of the spring loaded detents 116 (which may include retractable balls or pins) engage a recess 118 (illustrated in FIGS. 6A-6C) formed in the outer surface of the head 230 to secure the tool 100 in the locked position. Another recess 118 is positioned at a different location on the outer surface of the head 230 such that the spring loaded detents 116 engage the head 230 to secure the tool 100 in the unlocked position. The spring loaded detents 116 engage the recess 118 to hold the release handle 107 when retracted so that the locking rods 229 are not immediately locked back into place within the slots 227 of the slotted axle 225 by the springs 231. During retraction of the release handle 107, the locking rods 229 are no longer engaged with the slots 227 and the angle of the arm 103 can be adjusted. The recesses 118 may be a hole, a groove, a notch, or any other type of indention formed in the outer surface of the head 230 into which the spring loaded detents 116 may engage when aligned with the recess 118.

The slotted axle 225 includes the slots 227 that the head 230 of the locking rod 229 can engage, or extend into, to lock the slotted axle 225 and the arm 103 at a desired angle. In one embodiment, each slotted axle 225 includes three slots 227 that the locking rod 229 can lock the slotted axle 225 and the arm 103 into place at a desired angle, e.g., about −90°, about −45°, about 0°, about +45°, and about +90°, between the release handle 107 and the arm 103. More or less slots, and different angles are contemplated without departing from the scope of the present disclosure. A position indicator 224, in the form of, e.g., markings for each desired degree, is disposed on an exterior surface of the housing 106. The position indicator 224 serves as a guide for the user to adjust the angle of the arm 103 relative to the release handle 107.

Various components of the tool 100 can be made of an alloy such as an aluminum alloy (e.g. aluminum-6061, aluminum-7075, PEEK, and/or PEKK). These aluminum alloys are light in weight and durable. Various components of the tools can be coupled by screws, such as stainless steel screws, welding, or other suitable techniques. Other components of the tool 100 can be formed from or consist of PEEK rubber and/or PEKK rubber imbued with additives such as carbon fiber to adjust mechanical properties to desired levels.

Figure 6A:
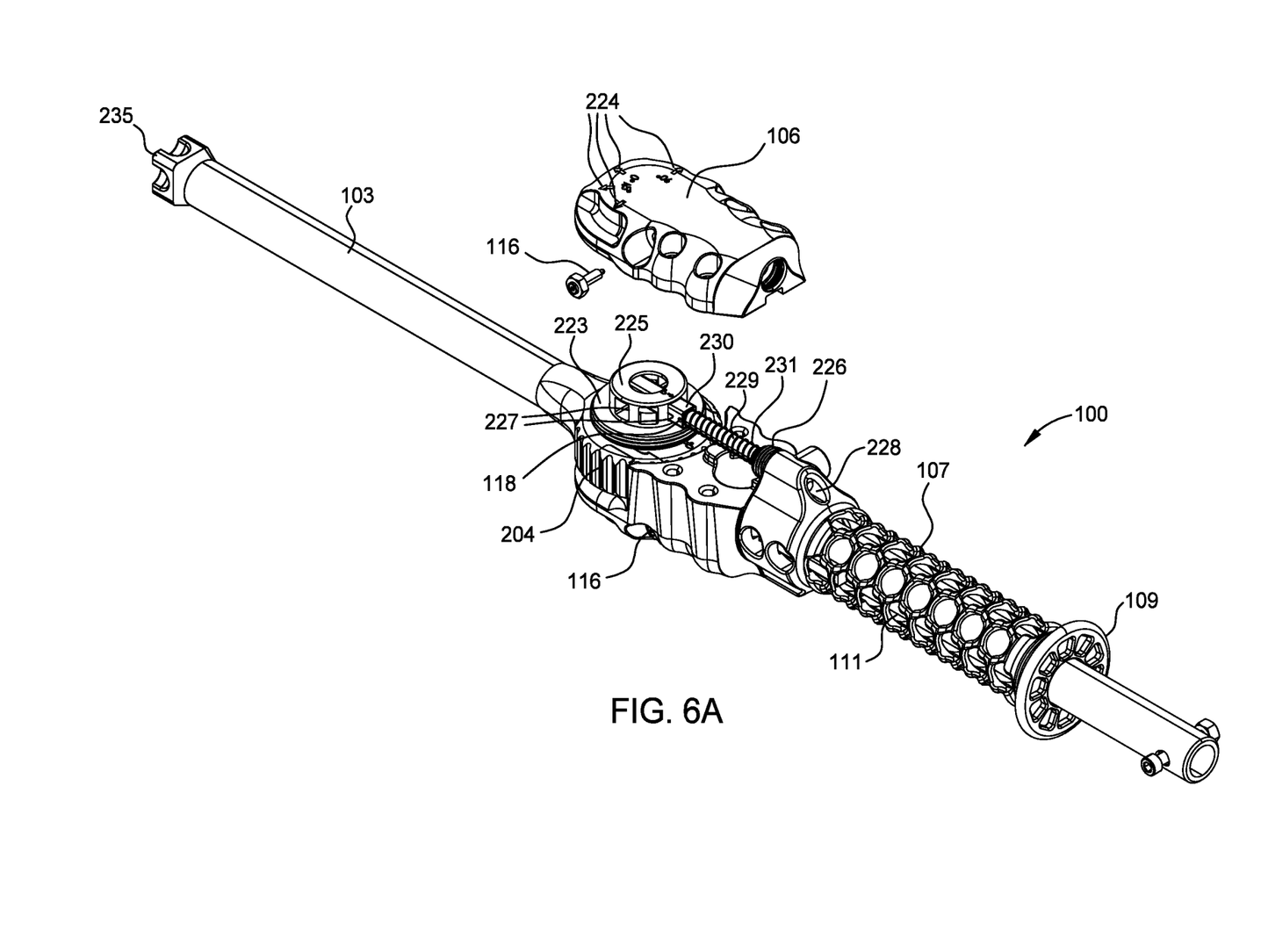
FIG. 6A is a perspective view of the pivoting assembly among other components of the tool in a locked, 0° position according to one embodiment of the present disclosure.
Figure 6B:
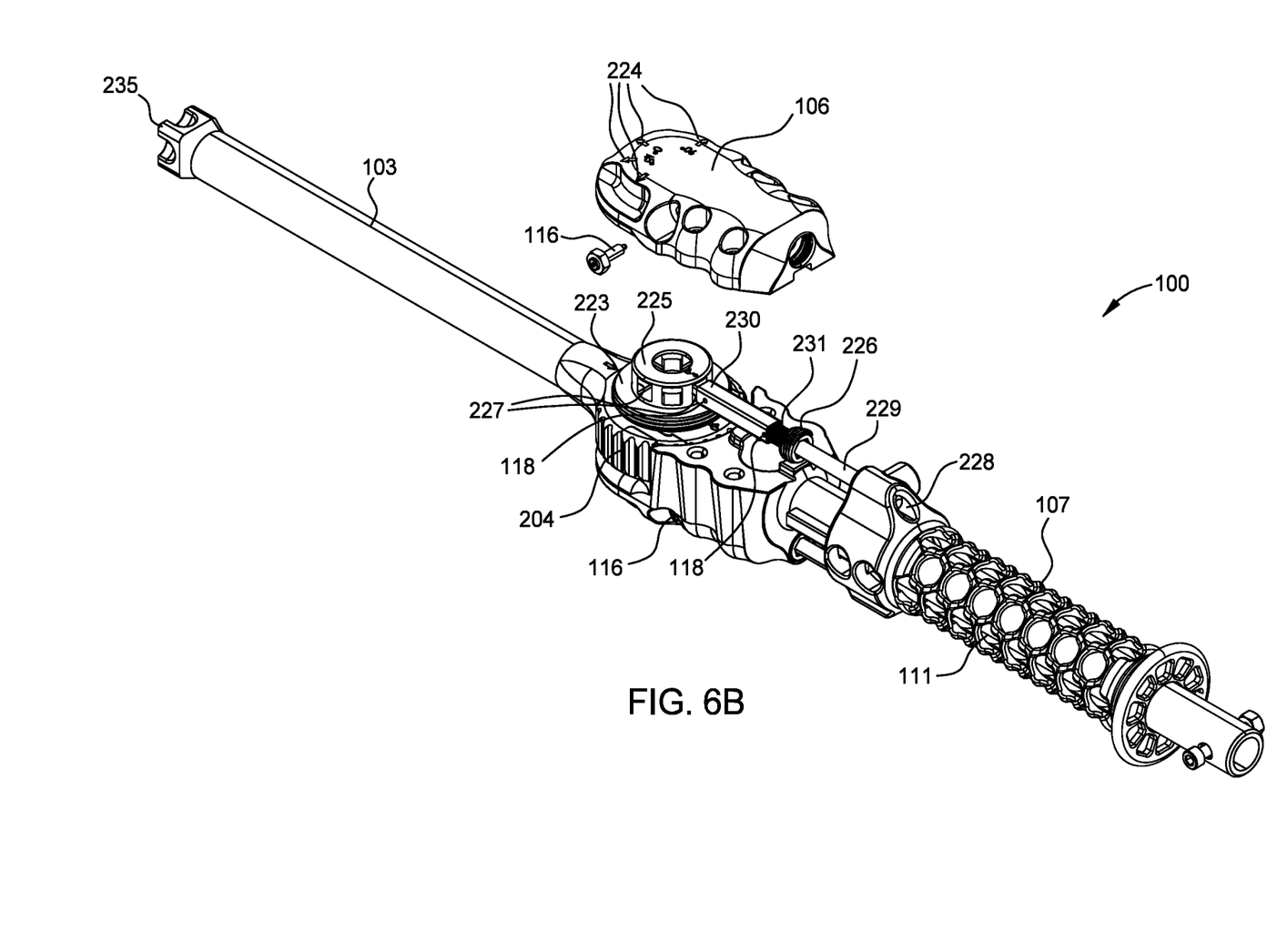
FIG. 6B is a perspective view of the pivoting assembly among other components of the tool in an unlocked, 0° position according to one embodiment of the present disclosure.
Figure 6C:
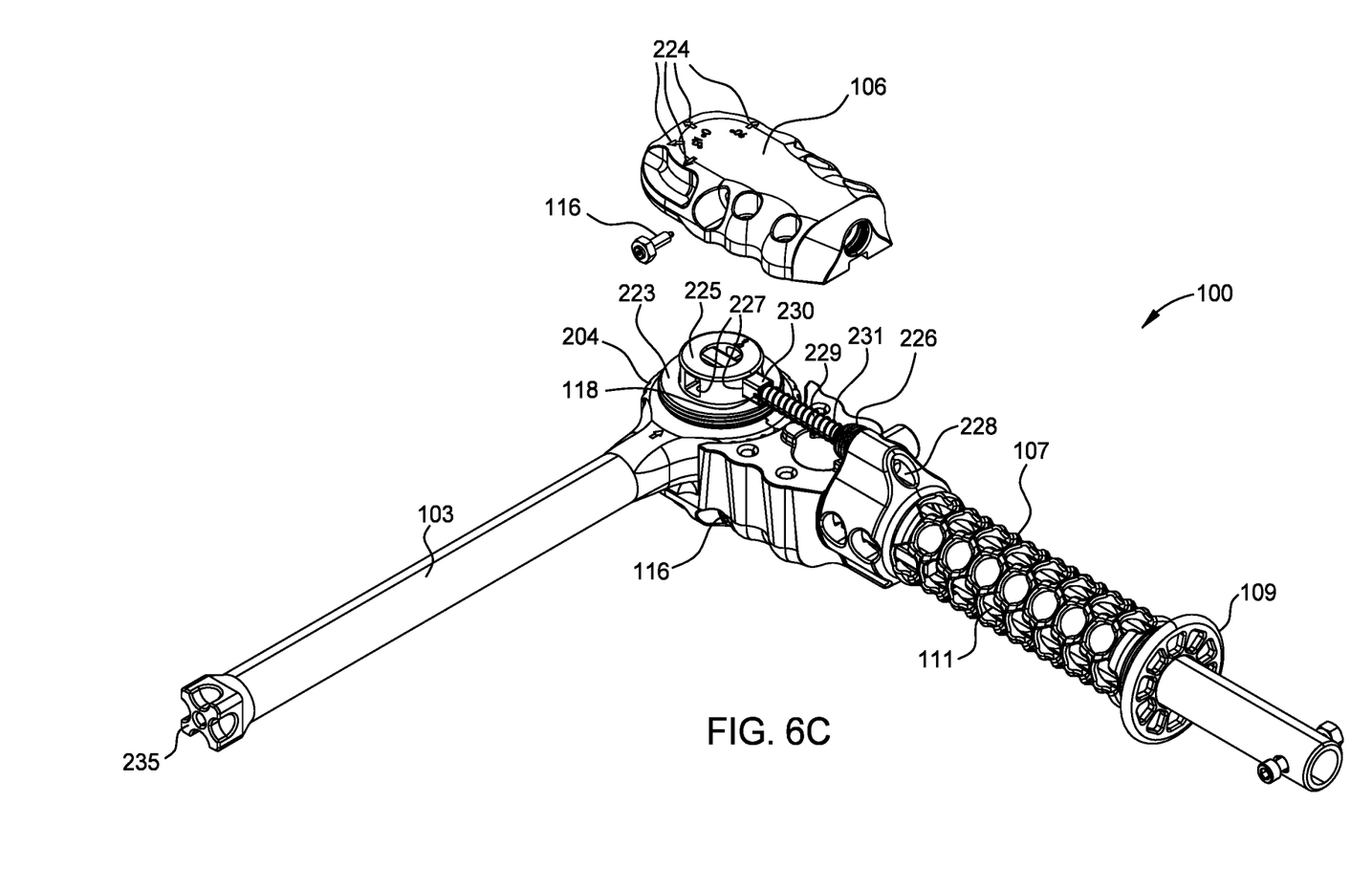
FIG. 6C is a perspective view of the pivoting assembly among other components of the tool in a locked, 90° position according to one embodiment of the present disclosure.

FIGS. 6A-6C are perspective views of the pivoting assembly 105 among other components of the tool 100 in various states of operation according to one embodiment of the present disclosure. The various states of operation can include a locked, 0° state (FIG. 6A), an unlocked, 0° state (FIG. 6B), and a locked, 90° state (FIG. 6C). The arm 103 is rotatably movable between at least these positions. The arm 103 has a travel path between, e.g., the following positions: the locked, 0° position, the unlocked, 0° position, and the locked, 90° position. The arm 103 can be rotatably movable in either direction between the locked, 0° position and the locked, 90° position. The arm 103 can be locked and unlocked at any position degree described above or other suitable position. The release handle 107 is a slidably moveable along the shaft 111 between the handle 113 and the housing 106. In addition, the arm 103 has a travel path between the locked, 0° position, the unlocked, 0° position, and the locked, 90° position, such that the arm 103 can be rotatably movable in either direction between the locked, 0° position and the locked, 90° position.

Generally, the pivoting assembly 105 locks and unlocks the arm 103 through slidable movement of the release handle 107. When unlocked, the arm 103 is freely rotatable, and when locked, the arm 103 is locked into a desired position. Movement of the release handle 107 along the shaft 111 causes interaction (e.g., engagement and disengagement) between the locking rods 229 and the slotted axle 225. When the release handle 107 is retracted (e.g., slidably traversed away from the housing 106), the spring loaded detents 116 engage one of the recesses 118 in the head of the locking rods 229 to hold the release handle 107 in the retracted position so that the springs 231 and locking rods 229 do not immediately lock back into place in the slotted axle 225. Once the locking rods 229 are disengaged from the slots 227, the arm 103 is free to rotate. Using the positional indicator 224 as a guide, the user can rotate arm 103 to the desired angle. Once the arm 103 is rotated to a desired angle, the locking rods 229 can be re-engaged by pushing the release handle 107 forward toward the housing 106. The tips of the spring loaded detents 116 are retracted and forced out of the recess 118 formed in the head 230 of the locking rods 229 when the release handle 107 and thus the locking rods 229 are moved. The springs 231 on the locking rods 229 help the user by applying a bias force against the head 230 of the locking rods 229 to move the locking rods 229 and the release handle 107 towards the housing 106 (where the spring 231 is elongated between the head 230 and the inner shoulder 120 of the housing 106) and back into the locked position. The tips of the spring loaded detents 116 are then extended back into the other recess 118 formed in the head 230 of the locking rods 229 when aligned with the recess 118 to secure the tool 100 in the locked position. This may be repeated any number of times by again pulling the release handle 107 away from the housing 106 (where the spring 231 is compressed between head 230 and the inner shoulder 120 of the housing 106), thereby moving the locking rods 229 out of the locked position.

FIG. 6A shows the pivoting assembly 105 in a locked, 0° position. At this position, rotation of the arm 103 is not permitted. That is, the locking rods 229 are positioned within the slots 227 of the slotted axle 225 to prevent the slotted axle 225, and thus the arm 103, from rotating between different positions. Here, the locking rods 229 engage (or lock within) the slots 227 of the slotted axle 225, thereby locking the arm 103 in place. The spring loaded detents 116 are coupled to the housing 106 such that the tips of the detents 116 engage one of the recesses 118 formed on the head 230 of the locking rods 229 to help keep the pivoting assembly 105 in the locked and unlocked positions. The spring loaded detents 116 engage the recesses 118 located closest to the spring 231 when the head 230 of the locking rods 229 are in the fully locked position within the slots 227 of the slotted axle 225. The spring loaded detents 116 engage the recesses 118 located further away from the spring 231 when the head 230 of the locking rods 229 are in the fully retracted, unlocked position outside of the slots 227 of the slotted axle 225 as shown in FIG. 6B. Although the upper portion of the housing 106 and one of the spring loaded detents 116 are shown in an exploded position in FIGS. 6A-6C, it is understood that when fully assembled, the spring loaded detent 116 would be positioned next to the head 230 of the locking rod 229 such that the tip of the spring loaded detent 116 would engage the recesses 118 formed at opposite ends in the outer surface of the head 230 when aligned with the recesses 118 as the locking rods 229 are moved into and out of engagement with the slotted axle 225. If it is desired to rotate the arm 103, the release handle 107 can be slidably retracted away from housing 106 and towards the handle 113. As the locking rods 229 are coupled to the release handle 107, retraction of the release handle 107 causes the locking rods 229 to move out of the slots 227 of the slotted axle 225, allowing the arm 103 to rotate freely.

FIG. 6B shows the pivoting assembly 105 in an unlocked, 0° position. At this position, the user may rotate the arm 103 to the desired angle. In the unlocked position, the locking rods 229 are no longer engaged with slots 227 of the slotted axle 225. In addition, the release handle 107 is moved away from the housing 106 and towards the handle 113. The spring loaded detents 116 engage the recesses 118 of the head 230 located further away from the spring 231 so that the release handle 107 is not forced back into the locking position. A user may reach the unlocked position by slidably moving the release handle 107 away from the housing 106 and towards the handle 113.

FIG. 6C shows the pivoting assembly 105 in a locked, 90° position, where the arm 103 is at a 90° angle to the handle. Although not shown, other angles can be chosen. In the locked, 90° position, the release handle 107 is moved away from the handle 113 and towards the housing 106. In addition, the locking rods 229 are engaged with the slots 227 of the slotted axle 225. The spring loaded detents 116 re-engage the recesses 118 of the head 230 closest to the spring 231 so that the release handle 107 is retained in the locked position. A user can reach the locked, 90° position by slidably moving the release handle 107 towards the housing 106 until it is flush (or almost flush) with the housing 106. At this position, the locking rods 229 are re-engaged with the slots 227 of the slotted axle 225 causing the arm 103 to be locked in place. Once locked, the user can begin using the tool 100 for, e.g., digging, raking, picking, trenching, etc.

FIG. 6C also illustrates a hub or a socket 235, described above, where a variety of heads 101 can be releasably coupled with the arm 103, providing access to numerous tools. Additionally, or alternatively, a universal adapter can be coupled to the hub or the socket 235, which can then be coupled to the head 101.

Embodiments described herein provide a pivoting assembly that has the ability to pivot at any angle from about −90° to about +90°. The pivoting assembly can be locked at −90°, −45°, 0°, +45°, and +90° angles relative to the handle 113. A housing protects the pivoting assembly such that it is dust-tolerant and durable to handle the lunar environment. The pivoting assembly can be incorporated in a tool for, e.g., scooping and shoveling in order to collect lunar samples from the moon surface.

For purposes of this disclosure, and unless otherwise specified, all numerical values within the detailed description and the claims herein are modified by "about" or "approximately" the indicated value, and consider experimental error and variations that would be expected by a person having ordinary skill in the art.

As used herein, the indefinite article "a" or "an" shall mean "at least one" unless specified to the contrary or the context clearly indicates otherwise. The term "coupled" is used herein to refer to elements that are either directly connected or connected through one or more intervening elements.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Any of the embodiments described herein can be combined in whole or in part with any other embodiment.

While the foregoing is directed to embodiments of the present disclosure, other and further embodiments of the disclosure may be devised without departing from the basic scope thereof, and the scope thereof is determined by the claims that follow.

What is claimed is:

1. An apparatus, comprising:
    a handle;
    a shaft coupled to the handle at one end and coupled to a pivoting assembly at the opposite end, the pivoting assembly at least partially disposed in a housing, the pivoting assembly comprising:
        a slotted axle;
        a locking rod having a head engageable with a slot of the slotted axle; and
        a release handle coupled to the locking rod and disposed around the shaft, the release handle being movable along the shaft relative to the housing to move the head of the locking rod into a locked position where the head extends into the slot of the slotted axle and an unlocked position where the head is removed from the slot of the slotted axle; and
    a rotatable arm coupled to the pivoting assembly, wherein the rotatable arm is rotatable relative to the handle when the head of the locking rod is in the unlocked position.

2. The apparatus claim 1, further comprising a spring loaded detent engageable with a recess formed in an outer surface of the head to retain the locking rod in the locked position.

3. The apparatus claim 2, wherein the spring loaded detent is engageable with another recess formed in the outer surface of the head to retain the locking rod in the unlocked position.

4. The apparatus of claim 1, wherein the rotatable arm is selectively rotatable between a locked, −90° position and a locked, +90° position.

5. The apparatus of claim 1, wherein the release handle comprises multiple openings formed along the length of the release handle.

6. The apparatus of claim 1, wherein the rotatable arm is coupled to the slotted axle, and wherein the rotatable arm and the slotted axle are rotatable relative to the housing when the head of the locking rod is moved to the unlocked position.

7. The apparatus of claim 1, wherein the rotatable arm comprises a toothed portion at least partially disposed in the housing.

8. The apparatus of claim 1, wherein a tool head is releasably coupled to the rotatable arm.

9. The apparatus of claim 1, further comprising:
a seal disposed on an outside diameter of the locking rod and adjacent to an inner side surface of the housing; and
a spring disposed around the outside diameter of the locking rod and between the seal and the head of the locking rod.

10. An apparatus, comprising:
a tool head;
a rotatable arm coupled the tool head, the rotatable arm selectively rotatable between a locked, −90° position and a locked, +90° position; and
a pivoting assembly coupled to the rotatable arm and at least partially disposed in a housing, the pivoting assembly comprising:
a slotted axle;
a locking rod having a head engageable with a slot of the slotted axle; and
a release handle coupled to the locking rod, the release handle being movable relative to the housing to lock and unlock the rotatable arm.

11. The apparatus of claim 10, wherein the tool head is releasably coupled to the rotatable arm.

12. The apparatus of claim 10, wherein the head of the locking rod is coupled to the slotted axle when the rotatable arm is in a locked position, and wherein the head of the locking rod is decoupled from the slotted axle when the rotatable arm is in an unlocked position.

13. The apparatus of claim 10, wherein the release handle is moved towards the housing when the rotatable arm is in a locked position, and wherein the release handle is moved away from the housing when the rotatable arm is in an unlocked position.

14. The apparatus of claim 10, further comprising a spring disposed in the housing to bias the head of the locking ring into the slot of the slotted axle.

15. The apparatus of claim 10, wherein the pivoting assembly further comprises a spring loaded detent engageable with a recess formed in an outer surface of the head to retain the locking rod in a locked position where the rotatable arm cannot be rotated, wherein the spring loaded detent is engageable with another recess formed in the outer surface of the head to retain the locking rod in an unlocked position wherein the rotatable arm can be freely rotated.

16. A method of operating an apparatus, comprising:
retracting a release handle of a pivoting assembly such that the pivoting assembly of the apparatus moves from a locked position to an unlocked position, the apparatus comprising:
a rotatable arm coupled to the pivoting assembly, the pivoting assembly at least partially enclosed in a housing;
a shaft coupled to the housing; and
the pivoting assembly comprising:
a slotted axle;
a locking rod having a head engageable with a slot of the slotted axle; and
the release handle coupled to the locking rod, the release handle being movable along the shaft relative to the housing to lock and unlock the rotatable arm; and
rotating the rotatable arm relative to the pivoting assembly to a position.

17. The method of claim 16, further comprising locking the rotatable arm in the position by moving the release handle along the shaft towards the housing.

18. The method of claim 16, wherein the head of the locking rod is coupled to the slotted axle when the rotatable arm is in a locked position, and wherein the head of the locking rod is decoupled from the slotted axle when the rotatable arm is in an unlocked position.

19. The method of claim 16, wherein the rotatable arm is selectively rotatable between a locked, −90° position and a locked, +90° position.

20. The method of claim 16, wherein the rotatable arm is selectively rotatable between:
a locked, first position wherein rotation of the rotatable arm is not permitted;
an unlocked position wherein rotation of the rotatable arm to a second position is permitted; and
a locked, second position wherein rotation of the rotatable arm is not permitted.

* * * * *